UNITED STATES PATENT OFFICE 2,304,156

ORGANIC COMPOUND AND PROCESS OF PREPARING THE SAME

Max Engelmann, Wilmington, Del., and Josef Pikl, Pitman, N. J., assignors to E. I. du Pont de Nemours & Company, Wilmington, Del., a corporation of Delaware No Drawing. Application March 7, 1940, Serial No. 322,766

12 Claims. (Cl. 260—403)

This invention relates to novel organic compounds and to processes of preparing the same. More particularly, this invention deals with phosphonic acids derived from organic acyl-amido methylol compounds.

It is an object of this invention to convert organic acyl-amido-methylol compounds into water-soluble derivatives which may be useful in the art of treatment of textile fibers for various purposes, especially water-proofing, or in various other fields. Other and further objects of this invention will appear as the description proceeds.

The novel compounds of this invention appear to be phosphonic acids and may be designated by the general formula

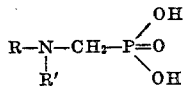

wherein R' stands for hydrogen or a lower alkyl radical, while R designates any organic radical whatsoever which is linked to the N atom through the keto group (CO) or the thione group (CS). Thus, R may stand for the grouping

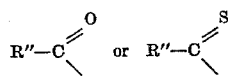

wherein R'' may be an aliphatic, cycloaliphatic, or aromatic radical, which may carry various substituents, for instance halogen, the carboxyl group or sulfonic acid radicals. Or R may take the form R''—O—CO, R''—NH—CO,

R''—CO—NH—CO, R''—O—CO—NH—CO etc., wherein R'' is a long-chain aliphatic radical. Further details concerning R and specific illustrations thereof are given in the examples hereinbelow.

According to our invention, we prepare these compounds by reacting on the corresponding amido- or thio-amido-methylol compounds with a phosphorus trihalide to produce an intermediate phosphorus-halide compound, which is then decomposed by water, or merely by contact with the atmospheric humidity, to give a phosphonic acid. For a better understanding of our process and the reactions involved therein, the discussion below will be limited to the simple group of methylol compounds of the formula

R—CONH—CH₂OH wherein R is an aliphatic radical joined to the CONH group either directly or through the agency of an oxygen atom, a sulfur atom, the imino radical, or various combinations of these with the CO group. It is to be understood, however, that our invention is not to be limited by this discussion, but is to be construed as applying broadly to the manufacture of compounds of the general formula above indicated.

Our invention therefore comprises as its first step the treatment of a methylol compound of the formula

R—CONH—CH₂OH wherein R is an organic radical, with a phosphorus trihalide, preferably the trichloride or tribromide. This treatment is to be effected in the absence of any solvent whatever, or in the presence of a non-aqueous liquid medium for instance an inert organic solvent, such as carbon tetrachloride, chloroform or acetone. The proportion of phosphorus trihalide to methylol compound should be not less than molar. However, a large excess thereof may be employed, to serve as a non-aqueous diluent for the reaction mass, in addition to the organic solvent or in lieu thereof.

This treatment is believed to transform the methylol compound into a dihalogen-phosphorous ester, thus:

R—CONH—CH₂OH+PCl₃ →
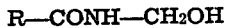
R—CONH—CH₂—O—PCl₂+HCl

In the next step of our procedure, this intermediate ester compound is transformed into a phosphonic acid by treatment with water after letting it stand in a closed vessel for a long period of time.

This reaction very likely takes place in two steps. Upon standing, the dihalogen phosphorus ester rearranges itself slowly into a phosphone dichloride, and the latter upon treatment with water yields a phosphonic acid, thus:

R—CONH—CH₂—OPCl₂ ⟶
(dichloro-phosphorous ester)

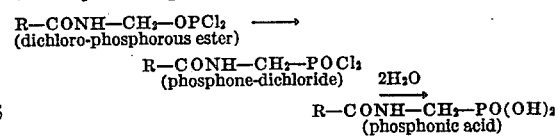

But we are not prepared to state with certainty that this is the exact course of the reaction.

The first step of our process is complete in a relatively short time, say an hour or two.

The second step, that is the rearrangement, requires a much longer period, measurable in days, but may generally be shortened to a few hours by the application of heat. Temperatures from 10 to 100° C. may be employed with safety during this step. This step may also be facilitated by the use of a small amount of a weak acid, such as acetic acid, propionic acid or acetic anhydride, which appear to have a catalytic effect.

The novel phosphonic acids of this invention are sometimes well crystallized bodies and sometimes oily products, depending upon the radical attached to the phosphorus. Most of them are soluble in water, especially when derived from an aliphatic amide of relatively low molecular weight. The OH groups of the phosphonic acid radical may be individually or jointly neutralized with organic or inorganic bases to produce the corresponding salts. We have actually prepared and isolated the ammonium, sodium, diethanol-ammonium and pyridinium salts. When heated with dilute hydrochloric acid for a prolonged period, the product may be split up into the corresponding free carboxylic acid on the one hand and amino-methyl phosphonic acid on the other hand, thus:

$$R-CONH-CH_2-PO(OH)_2 \xrightarrow{H_2O}$$
$$R-COOH + H_2N-CH_2-PO(OH)_2$$

They are generally useful as anti-oxidants and metal deactivators for the treatment of gasolines and oils. The compounds wherein R possesses a long aliphatic chain, of say 10 to 28 carbon atoms, may further be used as surface active agents in the aqueous treatment of textile materials, for instance cotton, wool, rayon or Nylon, especially to impart thereto a soft feel or washing-fast water-repellent qualities.

The methylol amides employed as initial materials may be prepared by reacting acid amides with formaldehyde as described in Annalen der Chemie, vol. 343, page 210, or by decomposing chloromethyl amides, such as are described in copending applications of Rogers, Serial Nos. 286,944 and 288,059 or in U. S. P. 2,131,362, or similar chloromethyl compounds, with an inorganic base like potassium carbonate. See also copending application of Josef Pikl, Ser. No. 362,790.

Without limiting our invention to any particular procedure, the following examples are given to illustrate our preferred mode of operation. Parts mentioned are by weight.

Example 1

20 parts of methylol benzamide were added to 20 parts of phosphorus trichloride at 10 to 15° C. A half hour later 16 parts of glacial acetic acid were added, and the reaction mass was allowed to stand in a closed vessel at room temperature for 48 hours. The excess of PCl₃ and the acetic acid was then removed in vacuo, and a thick paste was obtained which crystallized rapidly when a little water dissolved in acetone was added. The melting point of these crystals was 182° C.

The product dissolved readily in water and alcohol and analyzed according to the formula

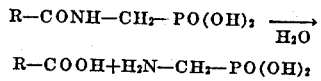

It is believed that during the standing period of 48 hours intramolecular rearrangement took place, converting the dichloro-phosphorus ester of the first step into a phosphone dichloride, which upon subsequent treatment with water gave a phosphonic acid of the formula above.

Example 2

100 parts of methylol stearmide were added gradually to a mixture of 45 parts of carbon tetrachloride and 91 parts of phosphorus trichloride. One hour after all the methylol amide had been added, 40 parts of acetic acid were added and the reaction mass was allowed to stand at room temperature for four days. The reaction mixture gradually became a viscous mass and at the same time soluble in dilute alkalies. The reaction mass which now contained probably the phosphone dichloride was treated with aqueous hydrochloric acid of 8% strength, at about 50° C. and yielded a crystalline, readily filterable, product which could be recrystallized from alcohol. The crystalline product melted to an opaque mass at about 108° C. but did not become completely homogeneous until heated to a much higher temperature. It was readily soluble in dilute alkalies and in hot water giving a viscous, foaming solution. This product is believed to be stearamido-methyl-phosphonic acid, as proven by the following test:

67 parts of the above product were heated in 1700 parts of 5% hydrochloric acid at 70 to 80° C. for 24 hours, with agitation. A viscous mass resulted, which upon cooling and filtering left a white filter cake which was identified as stearic acid. The filtrate upon evaporation gave 22 parts of residue which upon recrystallization from water resulted in a white crystalline solid, soluble in water with an acid reaction, and analyzing $$C=10.75\%, H=5.0\%, P=27.2\%, N=12.5\%$$

Theory for $NH_2-CH_2-PO(OH)_2$ is $$C=10.8\%, H=5.4\%, P=27.9\%, N=12.6\%.$$

This product did not melt up to 300° C.

When cotton was treated with an aqueous solution (2 to 4%) of the ammonium salt of the above stearamido-methyl phosphonic acid, and then heated to 150° C. for a few minutes, the fabric acquired a very soft feel and was strongly water repellent. These properties were not lost when the fabric was washed.

Example 3

30 parts of methylol stearamide were suspended in 300 parts of ethyl acetate and, at 25° C., 17 parts of phosphorus tribromide were added. When the reaction mass was warmed to 40° C. a clear solution resulted. It was held at 40 to 45° C. for two hours then allowed to cool to room temperature. After 14 hours a crystalline product had separated which was filtered off and analyzed. This intermediate, which was believed to be stearamido-methyl-phosphone-dibromide of the formula

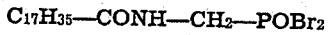

$$C_{17}H_{35}-CONH-CH_2-POBr_2$$

was then decomposed with water and crystallized from alcohol. The final product had the same properties as the product prepared according to Example 2.

Example 4

45 parts of the methylol derivative of the amides obtained from a mixture of fatty carboxylic acids having 20 and 22 carbon atoms were added to 100 parts of phosphorus trichloride at room temperature and agitated for 1 hour. 38 parts of acetic acid were then added and the mixture was allowed to stand at room temperature for 3 days. The hard reaction product which separated was broken up and decomposed by ice and then filtered. The product dissolved in methyl alcohol to an almost clear solution and crystallized again on cooling. This product was clearly soluble in water containing a small amount of a base like NaOH, ammonia or pyridine.

Example 5

Naphthenic acid amide was converted into the corresponding methylol compound by reacting the amide with formaldehyde in an alcoholic solution.

32 parts of the oily methylol naphthene amide was mixed with 27 parts of phosphorus trichloride and 24 parts of acetic acid, and then allowed to stand at room temperature for several days. The reaction mass was decomposed with ice and the oily bottom layer was taken up with petroleum ether. Upon evaporation of the solvent, a thick orange-colored oil was left which was soluble in warm water and in dilute alkalies. It contained the expected amount of phosphorus and nitrogen to satisfy the formula for the corresponding amido-methylene-phosphonic acid. This product exhibited strong antioxidant and metal deactivating properties, deactivating such metals as iron, manganese, cobalt and copper when used in gasoline or motor oil.

Example 6

32 parts of hydroabietic acid methylol amide were added at room temperature to 30 parts of phosphorus trichloride, then 16 parts of acetic acid were added and the reaction mass was allowed to stand at room temperature for several days. The originally thin mass gradually became a hard product which could not be stirred. When the reaction was completed, the condensation product was treated with 250 parts of water and the pasty product was taken up with ether. Upon evaporation of the ether, a hard mass remained which could be pulverized. It was soluble in dilute alkalies and had strong foaming properties.

Example 7

30 parts of methylol chloracetamide were added at 10 to 15° C. to 35 parts of phosphorus trichloride. The amide dissolved with evolution of some heat and a thin solution was obtained. 25 parts of glacial acetic acid was added and then allowed to stand at room temperature. The thin solution gradually became thicker and after a few days a rather hard mass was obtained. The excess of phosphorus trichloride and the acetic acid were removed in vacuo. The residue, which was very likely chloracetamido-methyl-phosphone dichloride, was very hygroscopic and dissolved readily in water and alcohol, giving presumably the phosphonic acid.

It will be understood that the above examples are merely illustrative, and may be varied in details within wide limits. Thus, instead of the methylol amides used in the above examples, there may be used an equivalent amount of methylolamides of the acids derived from vegetable oils and animal fats, as well as those of synthetic or natural fatty acids having a long or short chain, or the methylol amides of the aromatic acids. As suitable examples of such acids, may be mentioned for instance, acetic acid, naphthoic acid, o, m, or p-nitro-benzoic acid; the rosin acids, the terpene acids, the anthraquinone carboxylic acids; palmitic acid, phenylstearic acid, lauric acid, montanic acid and fatty acids from the catalytic paraffin oxidation. The methylols of double amides, like urea or adipic acid amide, may also be used.

The following examples illustrate further permissible extensions of our invention.

Example 8

50 parts of methylol-octadecyl carbamate, prepared according to French Patent No. 840,002, were added to 100 parts of phosphorus trichloride at room temperature. After agitating for one hour, 38 parts of glacial acetic acid were added and the reaction mass allowed to stand at room temperature for several days. The hard reaction mass was broken up, decomposed by ice and then filtered. By purification with methyl alcohol a small amount of an insoluble material was removed. The main fraction was very soluble in dilute aqueous ammonia. The analysis corresponded to that of the expected compound of the formula $$C_{18}H_{35}-O-CO-NH-CH_2-PO(OH)_2$$

When applied to cotton in the manner described in Example 2, it imparted to the fabric a strongly water repellent, soft finish.

Instead of the methylol-octadecyl-carbamate an equivalent amount of the methylol derivative of another carbamate of a higher or lower molecular weight may be used, for instance the methylol derivative of tetradecyl-carbamate, hexadecyl carbamate, phenyl carbamate, octadecyl-phenyl-carbamate $$(C_{18}H_{37}-C_6H_4-O-CONH-CH_2OH)$$

Example 9

8 parts of the dimethylol amide of methylene-distearamide, prepared as described below, were added to 20 parts of phosphorus trichloride at room temperature. To the clear thin solution which was obtained in a few minutes 5 parts of acetic acid were added. Upon standing at room temperature over night the mass solidified to a very thick plastic mass which dissolved in ammoniacal water.

The dimethylol-amide of methylene-distearamide above mentioned is believed to have the formula

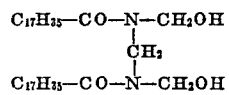

and is claimed as a new compound by Josef Pikl in copending application Ser. No. 362,790. It was prepared for our present purpose by reacting with 50% aqueous potassium carbonate solution upon methylene-bis(stearamido-methylchloride), which in turn was obtained by reacting with hydrogen chloride and formaldehyde upon distearamido-methane, as described more in detail in copending application of Rogers, Serial No. 286,944.

Many other variations and modifications will appear readily to those skilled in the art.

The novel compounds of this invention may be used for a number of purposes in the textile, paper, oil and gasoline field. They may be used either as free acids or as salts with organic or inorganic bases such as the sodium, potassium, ammonium, magnesium, calcium, silver, lead, pyridinium, dimethyl - cyclohexyl - ammonium salts, etc. For the use in oil and gasoline the free acids are preferred. In the textile field it is desirable to use the water-soluble salts, so as to prevent tendering of the fabric. The products containing a high molecular weight radical may be used for wetting agents, detergents, and softening agents; as mold inhibitors; and as moth-proofing or waterproofing agents. The best effect is usually obtained when the product is used in the form of its salt with a weak organic base like pyridine triethylamine dimethylamine or ammonia.

The use of these compounds for imparting water-repellency to cellulosic material has already been discussed and illustrated above. In smaller concentrations, they may be used for imparting to fabric a soft feel. When viscose rayon or cotton for instance is treated with a very dilute solution (0.1% to 1%) of the above mentioned ammonium salt and the goods subjected to a heat treatment as above described, the material becomes very soft and does not lose this property when washing with soap.

The above phosphonic acids and salts may also be applied together with other products such as wax emulsion, other waterproofing agents such as stearamido-methyl glycolic acid or with waterproofing agents of the type described in U. S. Patent No. 2,146,392, or together with waterproofing agents of the isocyanate and ketene classes.

In the oil and gasoline field these products are of great interest as they can be used as high pressure lubricants which have at the same time strong antioxidant properties. These products are also potent metal deactivators for iron, copper, cobalt and manganese.

We claim:

1. A chemical compound selected from the group consisting of the free acid form and the salts of a phosphonic acid of the general formula

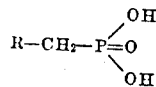

wherein R is the radical of a carboxylic acid amide, attached to the CH₂ group above shown through the nitrogen atom of the amido group.

2. A chemical compound selected from the group consisting of the salts and free acid form of a phosphonic acid of the general formula

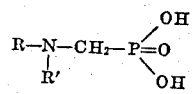

wherein R' stands for a member of the group consisting of hydrogen and lower alkyl, R is an organic radical which is linked to the N-atom through a link of the group consisting of the keto group (CO) and the thione group (CS).

3. A compound selected from the group consisting of organic acylamido-methylene-phosphonic acids and their salts.

4. A process for producing organic compounds, which comprises transforming an organic amido-methylol compound by the aid of a phosphorus trihalide into an intermediate phosphone-di-halide compound, and then decomposing the latter with water to give the corresponding phosphonic acid.

5. A process for producing organic compounds, which comprises reacting an organic amido-methylol compound of the general formula

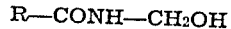

wherein R is an aliphatic radical, with a phosphorus trihalide selected from the group consisting of phosphorus chloride and prosphorus bromide to give an intermediate dihalogen-phosphorous ester of the general formula

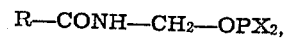

wherein X stands for a halogen of the group consisting of chlorine and bromine, subjecting the latter to intramolecular rearrangement to give a phosphone-dihalide of the formula

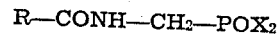

and then reacting upon the latter intermediate with water to produce a phosphonic acid of the general formula

wherein R has the same significance as above.

6. In the process of producing an organic compound, the step which comprises reacting upon an aliphatic acyl-amido-methylol with a phosphorus trihalide in a ratio not less than 1 mole of phorphorus trihalide per mole of the acyl-amido-methylol, to produce an aliphatic acyl-amido-methylene-dihalogen-phosphorous ester, and then converting the latter into the corresponding phosphone-dihalide.

7. In the process of producing an organic compound, the step which comprises hydrolyzing an aliphatic acyl-amido-methylene-phosphone-dihalide to produce the corresponding acyl-amido-methylene phosphonic acid.

8. A surface-active organic compound of the general formula R—CONH—CH₂—PO(OH)₂, wherein R is an aliphatic radical containing an alkyl chain of not less than 10 carbon atoms.

9. A water-soluble organic compound of the general formula R—CONH—CH₂—PO(OH)₂, wherein R is a cyclo-aliphatic radical.

10. A surface-active organic compound of the general formula R—CONH—CH₂—PO(OH)₂, wherein R is an aromatic radical.

11. A chemical compound selected from the group consisting of the free acid form and the salts of a phosphonic acid of the general formula

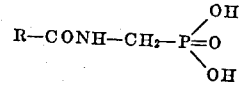

wherein R is an aliphatic hydrocarbon radical containing not less than 10 carbon atoms.

12. Stearamido-methyl-phosphonic acid.

MAX ENGELMANN.
JOSEF PIKL.